US012706622B2

(12) United States Patent
Ganti et al.

(10) Patent No.: US 12,706,622 B2
(45) Date of Patent: Aug. 11, 2026

(54) CONTROLLING RECEIVER GAIN FOR PROACTIVE JAMMER PROTECTION FROM TRANSMIT SIGNAL OF INTEGRATED TRANSMITTER

(71) Applicant: QUALCOMM Incorporated, San Diego, CA (US)

(72) Inventors: Kamalakar Ganti, San Marcos, CA (US); Thawatt Gopal, San Diego, CA (US); Tsai-Chen Huang, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/497,272

(22) Filed: Oct. 30, 2023

(65) Prior Publication Data

US 2025/0141476 A1 May 1, 2025

(51) Int. Cl.
*H04B 1/04* (2006.01)
*H04B 1/16* (2006.01)

(52) U.S. Cl.
CPC ............ *H04B 1/04* (2013.01); *H04B 1/1607* (2013.01); *H04B 2001/0408* (2013.01)

(58) Field of Classification Search
CPC ...... H04B 1/005; H04B 1/0053; H04B 1/109; H04B 1/1027; H04B 15/00; H04B 17/13; H04B 1/52
USPC ... 455/571, 552.1, 88, 208, 296, 67.11, 501; 370/280
See application file for complete search history.

(56) References Cited

U.S. PATENT DOCUMENTS 6,192,228 B1 * 2/2001 Agahi-Kesheh ..... H04B 1/1027 455/259
6,694,129 B2 * 2/2004 Peterzell ................ H04B 1/109 455/208
7,519,390 B2 * 4/2009 Malone ................ H04B 1/0053 455/88
8,115,549 B2 * 2/2012 Ogasawara ......... H03F 3/45179 330/253
9,197,332 B2 * 11/2015 Desai ..................... H04B 15/00
(Continued)

FOREIGN PATENT DOCUMENTS

CN 1251415 C * 4/2006 ............ H04B 1/109
CN 1770750 A * 5/2006
(Continued)

OTHER PUBLICATIONS

D. Wang et al., "A 2.85-mm2 Wideband RF Transceiver in 40-nm CMOS for IoT Micro-Hub Applications," in IEEE Transactions on Circuits and Systems I: Regular Papers, vol. 70, No. 10, pp. 3930-3943, Oct. 2023, doi: 10.1109/TCSI.2023.3290321 (Year: 2023).*
(Continued)

*Primary Examiner* — William D Cumming
(74) *Attorney, Agent, or Firm* — Loza & Loza LLP

(57) ABSTRACT

An apparatus, including: a receiver including a low noise amplifier (LNA) configured to amplify a received radio frequency (RF) signal based on a first protocol; a transmitter configured to generate a transmit RF signal based on a second protocol; and a first control circuit configured to control a gain of the LNA based on information regarding the transmit RF signal and the received RF signal.

29 Claims, 4 Drawing Sheets

(56) References Cited

U.S. PATENT DOCUMENTS

| | | | | |
|---|---|---|---|---|
| 9,407,226 | B2 * | 8/2016 | Liao | H03G 3/3036 |
| 10,819,302 | B1 | 10/2020 | Srinivasan et al. | |
| 2002/0123319 | A1 * | 9/2002 | Peterzell | H04B 1/109<br>455/296 |
| 2002/0132597 | A1 * | 9/2002 | Peterzell | H03D 3/009<br>455/67.11 |
| 2006/0084469 | A1 * | 4/2006 | Malone | H04B 1/52<br>455/552.1 |
| 2009/0156155 | A1 * | 6/2009 | Krug | H04N 21/4382<br>455/313 |
| 2010/0322117 | A1 * | 12/2010 | Gurski | H03G 3/3052<br>370/280 |
| 2014/0221028 | A1 * | 8/2014 | Desai | H04B 17/13<br>455/501 |
| 2015/0230185 | A1 * | 8/2015 | Vahid Far | H03F 1/086<br>455/571 |
| 2016/0182000 | A1 * | 6/2016 | Liao | H03F 1/0272<br>330/278 |
| 2022/0190950 | A1 | 6/2022 | Leung et al. | |
| 2025/0141476 | A1 * | 5/2025 | Ganti | H04B 1/005 |

FOREIGN PATENT DOCUMENTS

| | | | | | |
|---|---|---|---|---|---|
| CN | 107005202 | B | * | 10/2020 | H03F 1/0272 |
| EP | 1350332 | B1 | * | 11/2017 | H04B 1/109 |
| IL | 156857 | A | * | 4/2010 | H04B 1/109 |
| JP | 2004521534 | A | * | 7/2004 | H04B 1/109 |
| JP | 4105549 | B2 | * | 6/2008 | H04B 1/109 |
| JP | 2008535376 | A | * | 8/2008 | H04B 1/109 |
| JP | 2012530471 | A | * | 11/2012 | H03G 3/3042 |
| JP | 2018504032 | A | * | 2/2018 | H03F 3/193 |
| KR | 20070122468 | A | * | 12/2007 | H04L 27/3809 |
| WO | WO-02056490 | A2 | * | 7/2002 | H04B 1/109 |
| WO | WO-2005088849 | A1 | * | 9/2005 | H04W 88/06 |
| WO | WO-2025096131 | A1 | * | 5/2025 | H04B 1/1607 |

OTHER PUBLICATIONS

International Search Report and Written Opinion—PCT/US2024/049742—ISA/EPO—Jan. 23, 2025.

* cited by examiner

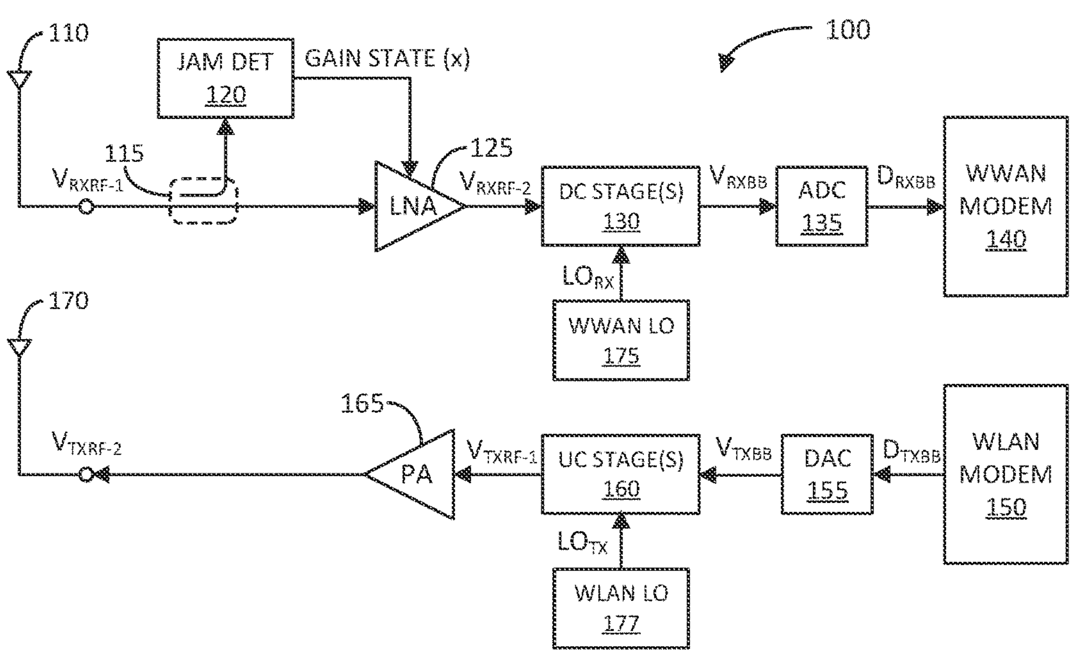
FIG. 1
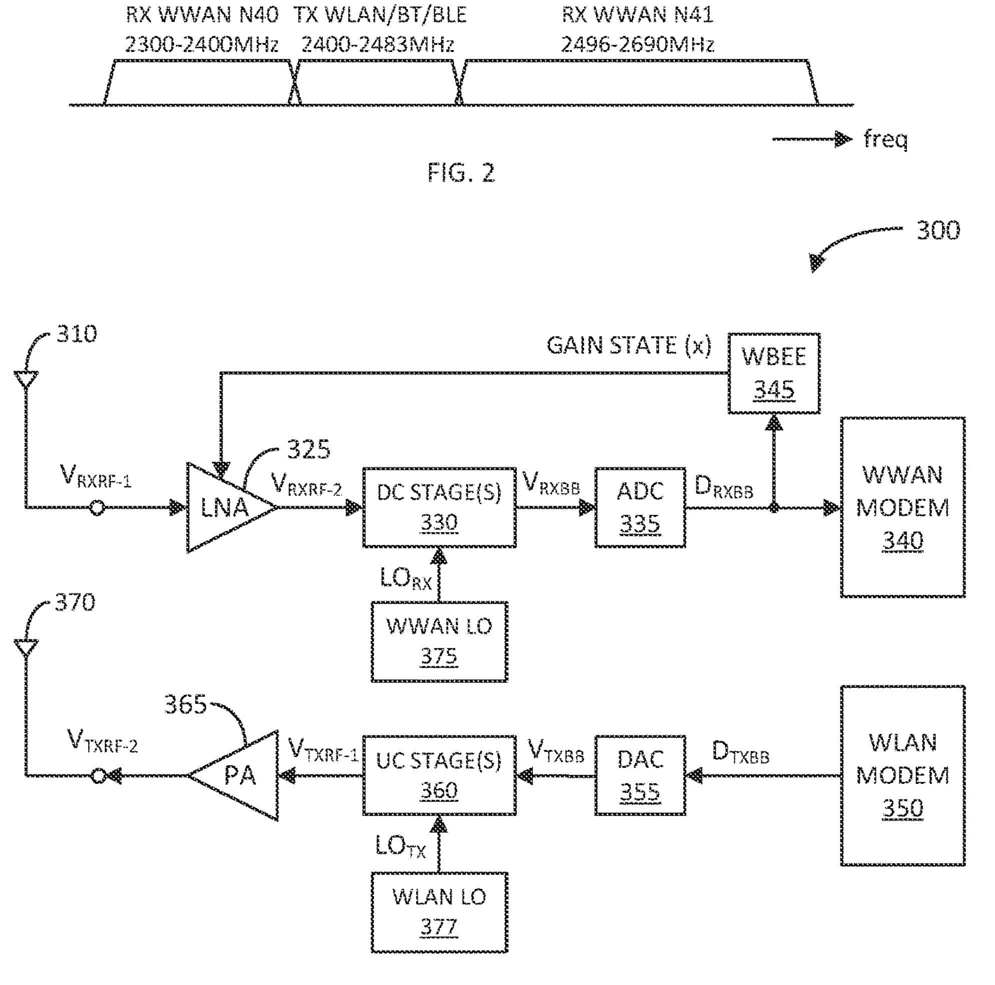
FIG. 2
FIG. 3

CONTROLLING RECEIVER GAIN FOR PROACTIVE JAMMER PROTECTION FROM TRANSMIT SIGNAL OF INTEGRATED TRANSMITTER

FIELD

Aspects of the present disclosure relate generally to receiver jammer protection, and in particular, to a proactive jammer protection by controlling a gain of a receiver based on concurrent reception and transmission of signals associated with an integrated transmitter.

BACKGROUND

A transceiver includes a transmitter configured to transmit radio frequency (RF) signal and a receiver configured to receive a received RF signal. In some cases, the received RF signal includes out-of-band jammers, which are unwanted or non-target received RF signals that may interfere with the processing of the target received RF signal. For example, an out-of-band jammer may saturate or cause a low noise amplifier (LNA) of the receiver to operate in an undesirable non-linear region that results reduced receiver sensitivity, signal distortion, and/or a reduction in the signal-to-noise ratio (SNR) associated with the target received RF signal. Some of the jammers may come from an integrated transmitter, which may be referred to as in-device jammers.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a receiver including a low noise amplifier (LNA) configured to amplify a received radio frequency (RF) signal based on a first protocol; a transmitter configured to generate a transmit RF signal based on a second protocol; and a first control circuit configured to control a gain of the LNA based on information regarding the transmit RF signal and the received RF signal.

Another aspect of the disclosure relates to a method. The method includes: amplifying a received radio frequency (RF) signal based on a first protocol; transmitting a transmit RF signal based on a second protocol; and controlling a gain associated with amplifying the received RF signal based on information regarding the transmit RF signal and the received RF signal.

Another aspect of the disclosure relates to an apparatus. The apparatus includes means for amplifying a received radio frequency (RF) signal based on a first protocol; means for transmitting a transmit RF signal based on a second protocol; and means for controlling a gain associated with amplifying the received RF signal based on information regarding the transmit RF signal and the received RF signal.

Another aspect of the disclosure relates to an apparatus. The apparatus includes: a set of receive chains including a set of low noise amplifiers (LNAs) configured to amplify a set of received radio frequency (RF) signals based on a wireless wideband area network (WWAN) protocol, respectively; a transmitter configured to generate a transmit RF signal based on a wireless local area network (WLAN) protocol; and a control circuit configured to control a set of gains of the set of LNAs based on information regarding power level and timing of the transmit RF signal and information regarding the set of received RF signals, respectively.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 1 illustrates a block diagram of an example transceiver in accordance with an aspect of the disclosure.

FIG. 2 illustrates example transmit and receive frequency bands that may generate an in-device jammer for a receiver of example transceivers described herein in accordance with another aspect of the disclosure.

FIG. 3 illustrates a block diagram of another example transceiver in accordance with another aspect of the disclosure.

DETAILED DESCRIPTION

Figures 4, 5:
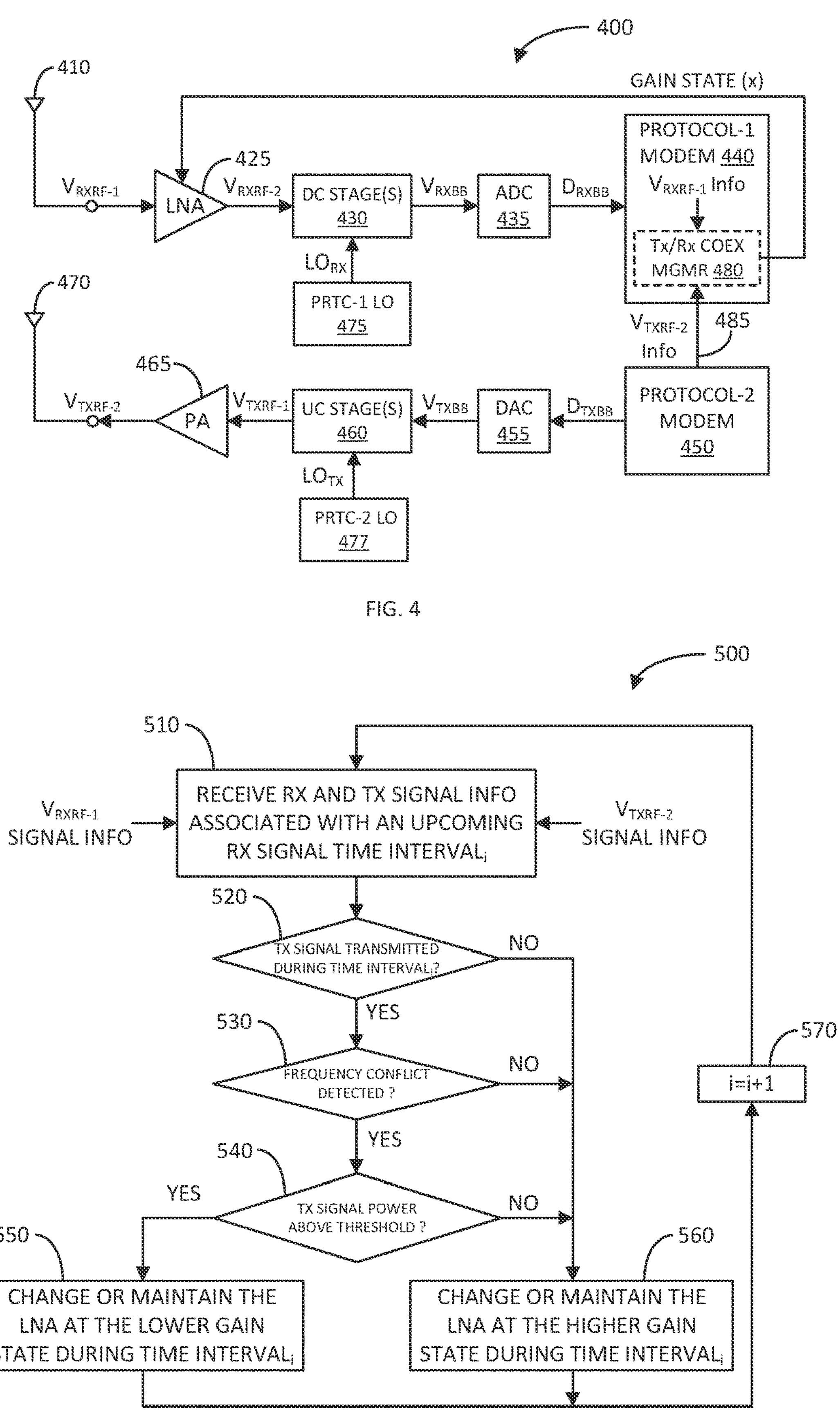
FIG. 4 illustrates a block diagram of another example transceiver in accordance with another aspect of the disclosure.
FIG. 5 illustrates a flow diagram of an example method of controlling a gain a low noise amplifier (LNA) in response to a detected in-device jammer in accordance with another aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

FIG. 1 illustrates a block diagram of an example transceiver 100 in accordance with an aspect of the disclosure. The transceiver 100 may be an example of one that receives and processes radio frequency (RF) signals based on a first protocol (e.g., a wireless wideband area network (WWAN), such as Long Term Evolution (LTE), Fifth Generation New Radio (5G NR, or "NR" for short), and transmits RF signals in accordance with a second protocol (e.g., a wireless local area network (WLAN), such as WiFi, and/or a wireless personal area network (WPAN), such as BLUETOOTH® (BT) and BLUETOOTH® Low Energy (BLE)). Although not explicitly discussed or shown, the transceiver 100 may also transmit RF signals based on the first protocol, and receive and process RF signals based on the second protocol.

In particular, the transceiver 100 includes a WWAN receiver including an antenna (e.g., an antenna array) 110, a coupler 115, a jammer detector 120, a low noise amplifier (LNA) 125, one or more frequency downconverting (DC) stages 130, an analog-to-digital converter (ADC) 135, and a WWAN modem 140. The transceiver 100 further includes a WLAN modem 150, a digital-to-analog converter (DAC) 155, one or more frequency upconverting (UC) stages 160, a power amplifier (PA) 165, and an antenna (e.g., an antenna array) 170. Additionally, the transceiver 100 may include a WWAN local oscillator (LO) 175 configured to generate one or more receive local oscillator (LO) signals $LO_{RX}$, and a WLAN LO 177 configured to generate one or more transmit LO signals $LO_{TX}$. Although, in this example, two LOs 175 and 177 are provided for both the WWAN receiver and WLAN transmitter, it shall be understood that the transceiver 100 (as well as other transceivers described herein) may include an integrated, shared, or common LO for both the WWAN receiver and WLAN transmitter, respectively.

In operation with regard to the receiver, the antenna 110 is configured to wirelessly receive an input RF signal $V_{RXRF\text{-}1}$ from a remote device, which may be provided to an input of the LNA 125 via the coupler 115. The coupler 115 is configured to provide a sample of the input RF signal $V_{RXRF\text{-}1}$ to the jammer detector 120. The jammer detector 120 is configured to detect whether there is a jammer (e.g., an unwanted signal) present at the input of the LNA 125, and generate a gain state (x) control signal for controlling the gain of the LNA 125 based on the detection. The LNA 125 is configured to amplify the input RF signal $V_{RXRF\text{-}1}$ with a gain based on the gain state (x) control signal to generate an amplified RF signal $V_{RXRF\text{-}2}$.

As an example, if the jammer detector 120 does not detect a jammer at the input of the LNA 125, the jammer detector 120 may generate a gain state control signal (x=1) that configures the LNA 125 with a relatively high gain (e.g., 35 decibels (dB)) and low linearity. As there is no jammer detected at the input of the LNA 125, the high gain and low linearity configuration of the LNA 125 achieves a relatively high signal-to-noise ratio (SNR) (e.g., 41 dB) for the amplified RF signal $V_{RXRF\text{-}2}$. If the jammer detector 120 detects a jammer at the input of the LNA 125, the jammer detector 120 may generate the gain state control signal (x=6) that configures the LNA 125 with a relatively low gain (e.g., 20 dB) and high linearity. For example, the low gain and high linearity configuration of the LNA 125 achieves a higher SNR (e.g., 31 dB) for the amplified RF signal $V_{RXRF\text{-}2}$ compared to an SNR (e.g., nine (9) dB) for the amplified RF signal $V_{RXRF\text{-}2}$ if the gain state were kept at x=1.

The one or more DC stages 130 frequency downconverts the amplified RF signal $V_{RXRF\text{-}2}$ by mixing it (e.g., in stages) with the one or more LO signals $LO_{RX}$ from the LO 175 to generate an analog received baseband signal $V_{RXBB}$. The ADC 135 converts the analog received baseband signal $V_{RXBB}$ from analog to digital to generate a digital received baseband signal $D_{RXBB}$. The digital received baseband signal $D_{RXBB}$ is provided to the WWAN modem 140 for further processing (e.g., to recover the data in the digital received baseband signal $D_{RXBB}$).

With regard to the operation of the transmitter, the WLAN modem 150 generates a digital transmit baseband signal $D_{TXBB}$, which includes data for wireless transmission to one or more remote devices. The DAC 155 converts the digital transmit baseband signal $D_{TXBB}$ from digital to analog to generate an analog transmit baseband signal $V_{RXBB}$. The one or more UC stages 160 frequency upconverts the analog transmit baseband signal $V_{RXBB}$ by mixing it (e.g., in stages) with the one or more LO signals $LO_{TX}$ from the LO 175 to generate a transmit RF signal $V_{RXRF\text{-}1}$. The PA 165 amplifies the transmit RF signal $V_{RXRF\text{-}1}$ to generate a power amplified transmit RF signal $V_{RXRF\text{-}2}$. The RF signal $V_{RXRF\text{-}2}$ is provided to the antenna 170 for wireless transmission to one or more remote devices.

More specifically, with regard to the jammer detector 120, the detected jammer at the input of the LNA 125 may originate from outside of the transceiver 100 (e.g., transmission by a remote device). Additionally, the detected jammer may also originate from the transmitter via leakage coupling between the antennas 170 and 110. In both out-device jammer and in-device jammer scenarios, the jammer detector 120 may be able to detect such jammers, and set the LNA 125 to the lower gain state to achieve an acceptable SNR for the amplified received RF signal $V_{RXRF\text{-}2}$, as well as other signals downstream (e.g., $V_{RXBB}$ and $D_{RXBB}$). A drawback with this approach is that the jammer detector 120 is expensive with regard to bill of materials (BOM) cost, and may consume significant power. Accordingly, for certain applications, it may not be desirable to employ the jammer detector 120 in a receiver or to reduce the requirements of the jammer detector 120 or provide additional jammer protection even in the presence of a jammer detector.

FIG. 2 illustrates example transmit and receive frequency bands that may generate an in-device jammer for a receiver of example transceivers described herein in accordance with another aspect of the disclosure. In this example, there is a WLAN/BT/BLE transmit band extending in frequency from 2400 mega Hertz (MHz) to 2483 MHZ (e.g., or a bandwidth (BW) of 83 MHz). There is also a WWAN N40 receive band extending in frequency from 2300 MHz to 2400 MHZ (e.g., or a BW of 100 MHz). Additionally, there is also a WWAN N41 receive band extending in frequency from 2496 MHz to 2690 MHz (e.g., or a bandwidth (BW) of 194 MHz).

As the WWAN receive bands N40 and N41 are close in frequency to the WLAN/BT/BLE transmit band, a concurrent transmission of the WLAN/BT/BLE RF signal $V_{TXRF\text{-}2}$ with a reception of the N40 or N41 received RF signal $V_{RXRF\text{-}1}$ may generate an in-device jammer at the input of the LNA 125 if the power level of the transmit RF signal $V_{TXRF\text{-}2}$ is sufficiently high. Another in-device jammer scenario may pertain to concurrent transmission of a WLAN five (5) giga Hertz (GHz) signal (e.g., 5150 MHz to 5350 MHz) with a reception of a WWAN N79 signal (e.g., 4400 MHz to 5000 MHZ). In the case of transceiver 100, the jammer detector 120 may be able to detect such in-device jammer, and configure the LNA 125 in the lower gain state (x=6) so that the SNR of the amplified received RF signal $V_{RXRF\text{-}2}$ (as well as the other signals downstream) are not significantly impacted. But, as discussed above, the jammer detector 120 may not be desirable for certain applications due to high BOM costs and power consumption.

FIG. 3 illustrates a block diagram of another example transceiver 300 in accordance with another aspect of the disclosure. The transceiver 300 is similar to that of transceiver 100 previously discussed in detail, including many same/similar elements identified with the same reference numbers but with the most significant digit being a "3" in transceiver 300 instead of a "1" in transceiver 100. The transceiver 300 differs from transceiver 100 in that the jammer detector 120 and associated coupler 115 are not included in transceiver 300. Instead, in transceiver 300, jammer detection is performed in the digital and baseband domains by a wideband energy estimator (WBEE) 345 (e.g., generally a control circuit).

That is, the WBEE 345 is configured to perform an energy estimation of the digital received baseband signal $D_{RXBB}$ to determine whether a jammer is present at the input of the LNA 325. For example, if the WBEE 345 determines that the estimated energy of the digital received baseband signal $D_{RXBB}$ is above a threshold, this could indicate that there is a jammer at the input of the LNA 325. Conversely, if the WBEE 345 determines that the estimated energy of the digital received baseband signal $D_{RXBB}$ is below a threshold, this could indicate that there is no jammer at the input of the LNA 325. In response to detecting the jammer, the WBEE 345 generates the gain state (x=6) control signal to configure the LNA 325 with a lower gain. If, on the other hand, the WBEE 345 does not detect a jammer at the input of the LNA 325, the WBEE 345 generates the gain state (x=1) control signal to configure the LNA 325 with the higher or default gain.

A drawback of the WBEE approach is that it may not be able to detect all in-device jammers, especially those that are associated with: (1) a transmit band and a receive band that are close in frequency (e.g., as exemplified with the transmit and frequency bands discussed with reference to FIG. 2); (2) the power of the transmit RF signal $V_{TXRF-2}$ being relatively high; and (3) the transmission and receptions of the RF signals $V_{TXRF-2}$ and $V_{RXRF-1}$ are concurrent. The reason being is that the transmit RF signal $V_{TXRF-2}$ leaking into the receiver input via the antenna-to-antenna coupling compresses the LNA 325 such that the estimated energy of the digital received baseband signal $D_{RXBB}$ performed by the WBEE 345 remains below the threshold. In such in-device jammer scenario, the SNR of the amplified received RF signal $V_{RXRF-2}$ (as well as the other downstream signals) is significantly degraded.

FIG. 4 illustrates a block diagram of another example transceiver 400 in accordance with another aspect of the disclosure. The transceiver 400 includes some same/similar elements as the previous transceivers 100 and 300, such as: (1) a receiver including antenna 410, LNA 425, one or more DC stages 430, an ADC 435, and a protocol-1 (e.g., WWAN) modem 440; (2) a transmitter including a protocol-2 (e.g., WLAN/BT/BLE) modem 450, a DAC 455, one or more UC states 460, a PA 465, and an antenna 470; and (3) LOs 475 and 477.

In the case of transceiver 400, it includes a Tx/Rx coexistence (COEX) manager 480 (e.g., generally a control circuit) for dealing with certain in-device jammers, as discussed further herein. The Tx/Rx COEX manager 480 may be implemented in the protocol-1 (e.g., WWAN) subsystem, such as in a processor, integrated circuit (IC), system on chip (SOC) that includes the protocol-1 modem operations, in a dedicated circuit or processor, or integrated in the transceiver 400 in other manners.

The Tx/Rx COEX manager 480 receives information regarding the transmit RF signal $V_{TXRF-2}$ from the protocol-2 modem 450 via a side communication link (e.g., a 2-wire universal asynchronous receiver/transmitter (UART)) 485, receives information regarding the received RF signal $V_{RXRF-1}$, and detects (or determines) whether an in-device jammer condition exists. In response to detecting or determining the in-device jammer condition, the Tx/Rx COEX manager 480 reduces the gain of the LNA 625 to a lower gain state (x=6) during a time interval where the transmission of the RF signal $V_{TXRF-2}$ and the reception of the RF signal $V_{RXRF-1}$ are concurrent. In response to not detecting the in-device jammer condition, the Tx/Rx COEX manager 480 may maintain the gain of the LNA 625 to the higher or default gain state (e.g., x=1).

The information the Tx/Rx COEX manager 480 considers in detecting whether the in-device jammer condition exists include: (1) the frequency, bandwidth, or band of the transmit RF signal $V_{TXRF-2}$; (2) the power level of the transmit RF signal $V_{TXRF-2}$; (3) the time interval in which the RF signal $V_{TXRF-2}$ is transmitted; (4) the frequency, bandwidth, or band of the received RF signal $V_{RXRF-1}$; and (5) the time interval in which the RF signal $V_{RXRF-1}$ is received.

For example, if the Tx/Rx COEX manager 480 determines that the transmission of the RF signal $V_{TXRF-2}$ and the reception of the RF signal $V_{RXRF-1}$ are not concurrent during a time interval, then the Tx/Rx COEX manager 480 detects no in-device jammer condition. Otherwise, if the Tx/Rx COEX manager 480 determines that the transmission of the RF signal $V_{TXRF-2}$ and the reception of the RF signal $V_{RXRF-1}$ are concurrent during the time interval, then the Tx/Rx COEX manager 480 may consider other information to determine whether an in-device jammer condition.

For instance, if the Tx/Rx COEX manager 480 determines that the frequency, bandwidth, band of the transmit RF signal $V_{TXRF-2}$ is sufficiently far from the frequency, bandwidth, band of the received RF signal $V_{RXRF-1}$, then the Tx/Rx COEX manager 480 detects no in-device jammer condition. Otherwise, if the Tx/Rx COEX manager 480 determines that the frequency, bandwidth, band of the transmit RF signal $V_{TXRF-2}$ is sufficiently close to the frequency, bandwidth, band of the received RF signal $V_{RXRF-1}$ (e.g., Rx WWAN N40 or N41 and Tx WLAN/BT/BLE 2.4 GHz; or Rx WWAN N79 and Tx WiFi 5 GHZ), then the Tx/Rx COEX manager 480 may consider other information to determine whether an in-device jammer condition. The Tx/Rx COEX manager 480 may utilize a table identifying transmit and receive band pairing that the Tx/Rx COEX manager 480 may consider with other information to detect whether an in-device jammer condition exist.

Further, if the Tx/Rx COEX manager 480 determines that the power level of the transmit RF signal $V_{TXRF-2}$ is not above a threshold, then the Tx/Rx COEX manager 480 detects no in-device jammer condition. Otherwise, if the Tx/Rx COEX manager 480 determines that the power level of the transmit RF signal $V_{TXRF-2}$ is above the threshold, then the Tx/Rx COEX manager 480 may detect an in-device jammer condition with the other factors discussed above. And, as previously discussed, if the Tx/Rx COEX manager 480 detects an in-device jammer condition, the Tx/Rx COEX manager 480 reduces the gain of the LNA 425 to the lower gain state (x=6) during the time interval of concurrent transmission and reception of the signal $V_{TXRF-2}$ and $V_{RXRF-1}$ so that the in-device jammer does not significantly impact the SNR of the amplified received RF signal $V_{RXRF-2}$ (as well as other downstream signals). The following describes an example method of detecting an in-device jammer implemented by the Tx/Rx COEX manager 480.

FIG. 5 illustrates a flow diagram of an example method 500 of controlling a gain of a low noise amplifier (LNA) in response to a detected in-device jammer in accordance with another aspect of the disclosure. The method 500 may be employed by any of the Tx/Rx COEX managers described herein, but Tx/Rx COEX manager 480 (as well as other components of transceiver 400) serve below to exemplify the method 500 described below.

The method 500 includes the Tx/Rx COEX manager 480 optionally receiving receive and transmit signal (e.g., $V_{RXRF-1}$ and $V_{TXRF-2}$) information associated with an upcoming $i^{th}$ time $interval_i$ (e.g., may span a plurality of reception time slots) for receiving the received signal (e.g., $V_{RXRF-1}$) (block 510). Alternatively, or in addition to, the information provided to the Tx/Rx COEX manager 480 may be that the receiver and the transmitter may be active at the same time. In such case, the gain state of the LNA 425 may be lowered on the basis that both the receiver and transmitter are or will be active at the same time. The method 500 further includes determining whether the transmit signal (e.g., $V_{TXRF-2}$) will be transmitted during the time interval (block 520). If no, the Tx/Rx COEX manager 480 may deem that there is no in-device jammer condition during time $interval_i$, and may change or maintain the gain of the LNA 425 at the higher or default gain state (e.g., x=1) during time $interval_i$ (block 560).

If, in block 520, the Tx/Rx COEX manager 480 determines that the transmit signal (e.g., $V_{TXRF-2}$) will be transmitted during time $interval_i$, the Tx/Rx COEX manager 480 may optionally determine whether there is a frequency conflict between the transmit frequency and the received frequency (block 530). The frequency conflict may entail that for certain transmit and receive frequency pairs, there may be a first (e.g., relatively low) level of interference at the receiver where the gain of the LNA 425 may not need to be lowered, while for other transmit and receive frequency pairs, there may be a second (e.g., relatively high or higher than the first level of interference) level of interference at the receiver where the gain of the LNA 425 may be lowered for receiver performance considerations. If no, the Tx/Rx COEX manager 480 may deem that there is no in-device jammer condition during time $interval_i$, and may change or maintain the gain of the LNA 425 at the higher or default gain state (e.g., x=1) during time interval; (block 560).

If, in block 530, the Tx/Rx COEX manager 480 determines that there is a frequency conflict between the transmit band and the received band (e.g., Rx WWAN N40 or N41 and Tx WLAN/BT/BLE 2.4 GHz; or Rx WWAN N79 and Tx WiFi 5 GHZ), the Tx/Rx COEX manager 480 may operationally determine whether the power level of the transmit signal (e.g., $V_{TXRF-2}$) during time $interval_i$ is above a threshold (block 540). If no, the Tx/Rx COEX manager 480 may deem that there is no in-device jammer condition during time $interval_i$, and may change or maintain the gain of the LNA 425 at the higher or default gain state (e.g., x=1) during time $interval_i$ (block 560).

If, in block 540, the Tx/Rx COEX manager 480 determines that the power level of the transmit signal (e.g., $V_{TXRF-2}$) during time interval; is above the threshold, the Tx/Rx COEX manager 480 may detect an in-device jammer condition during time $interval_i$, and may change or maintain the gain of the LNA 425 at the lower gain state (e.g., x=6) during time $interval_i$ (block 550). The Tx/Rx COEX manager 480 may then perform the same operations per blocks 510 to 550/560 to determine whether there is an in-device jammer condition during the next time $interval_{i+1}$ (block 570).

Figure 6:
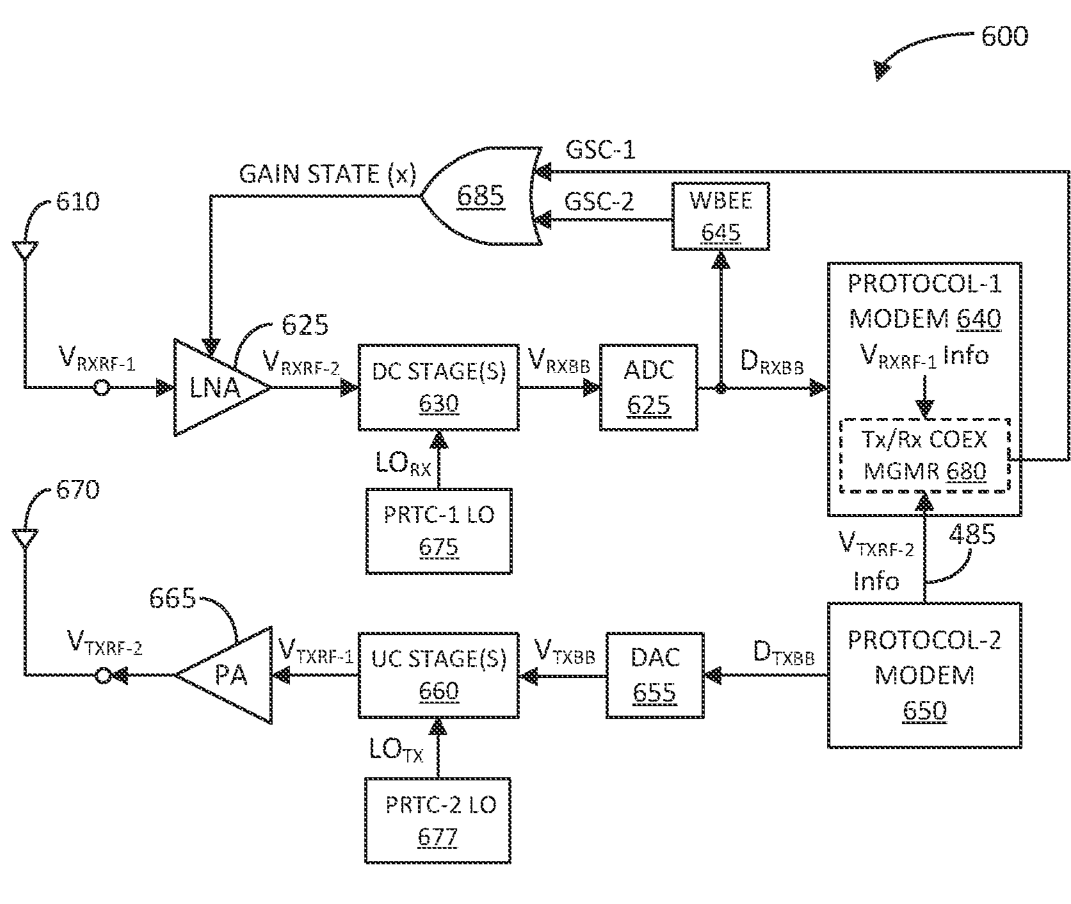
FIG. 6 illustrates a block diagram of another example transceiver in accordance with another aspect of the disclosure.

FIG. 6 illustrates a block diagram of another example transceiver 600 in accordance with another aspect of the disclosure. The transceiver 600 may be a variation of transceiver 400 previously discussed, and includes many of the same/similar elements as indicated by the same reference numbers except that their most significant digit is a "6" for transceiver 600 instead of a "4" as in transceiver 400.

The transceiver 600 further includes a WBEE 645 (e.g., generally a control circuit) for determining out-device jammers and certain in-device jammers that may not meet the in-device jammer requirements of the Tx/Rx COEX manager 680. For example, if the transmit band and receive band pairing is not identified as part of the in-device jammer requirement of the Tx/Rx COEX manager 680, the WBEE 645 may be able to detect such in-device jammers (as well as out-device jammers) for the purpose of controlling the gain of the LNA 625.

In this regard, the Tx/Rx COEX manager 680 may generate a first gain state control (GSC-1) signal based on detecting certain in-device jammer that meets the requirement as discussed with reference to transceiver 400 and method 500. Similarly, the WBEE 645 may generate a second gain state control (GSC-2) based on detecting out-device and certain in-device jammers by performing energy estimation on the digital received baseband signal $D_{RXBB}$ (or in some other implementations, the analog received baseband signal $V_{RXBB}$) as discussed with reference to transceiver 300. The transceiver 600 may include a logic circuit, such as an OR gate 685 configured to perform a logic OR operation on the control signals GSC-1 and GSC-2 to generate the gain state (x) control signal for the LNA 625.

Thus, if any one or both of the Tx/Rx COEX manager 680 or WBEE 645 detect a jammer condition or jammer, any one or both of the control signal GSC-1 or GSC-2 may be asserted (e.g., a logic one (1)) to cause the logic circuit 685 to generate the gain state (x=6) control signal to set the gain of the LNA 625 to the lower gain state. If none of the Tx/Rx COEX manager 680 or WBEE 645 detect a jammer condition or jammer, both control signals GSC-1 and GSC-2 may be deasserted (e.g., a logic zero (0)) causing the logic circuit 685 to generate the gain state (x=1) control signal to set the gain of the LNA 625 to the higher or default gain state.

Although not explicitly shown, the transceiver 400 and/or 600 may include an analog jammer detector, such as jammer detector 120 in certain applications, such as for a transceiver having lower performance requirements, smaller circuit footprint, and/or based on other considerations.

Figure 7:
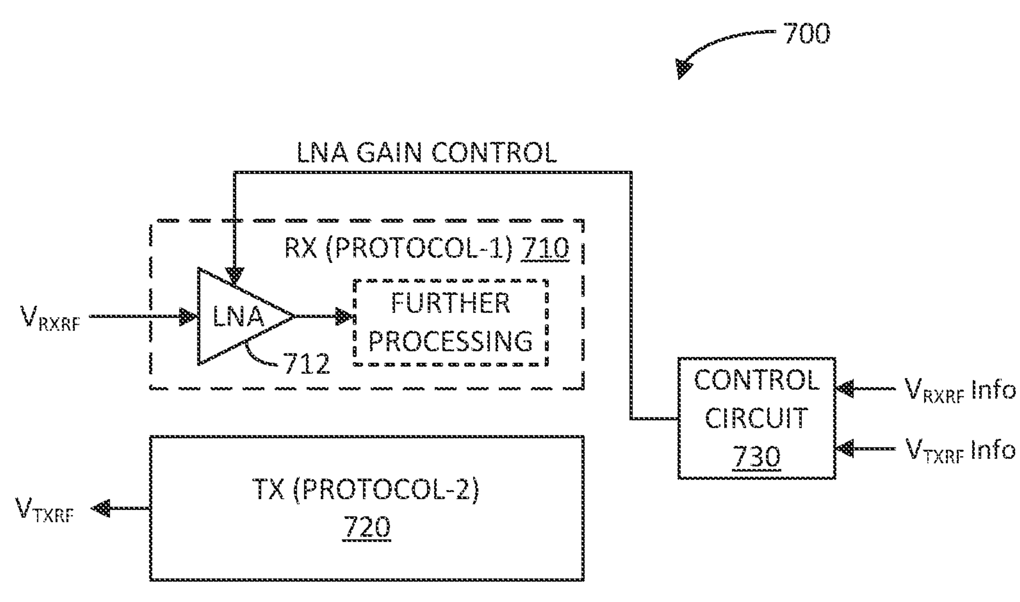
FIG. 7 illustrates a block diagram of another example transceiver in accordance with another aspect of the disclosure.

FIG. 7 illustrates a block diagram of another example transceiver 700 in accordance with another aspect of the disclosure. The transceiver 700 includes a receiver 710 including a low noise amplifier (LNA) 712 configured to amplify a received RF signal $V_{RXRF}$ based on a first protocol (e.g., WWAN) for further processing; a transmitter 720 configured to generate a transmit radio frequency (RF) signal $V_{TXRX}$ based on a second protocol (e.g., WLAN/BT/BLE); and a control circuit 730 configured to control a gain of the LNA 712 based on information regarding the transmit RF signal $V_{TXRX}$ and the received RF signal $V_{RXRF}$. Thus, if the transmit RF signal $V_{TXRX}$ is, will be, or expected to be an in-device jammer for the receiver, the gain of the LNA 712 may be lowered to operate the LNA 712 in a more linear region to avoid compression or saturation of the LNA 712 due to an expected or likely jammer, and improve the SNR of the received signal processed by the receiver if the jammer is realized.

Figure 8:
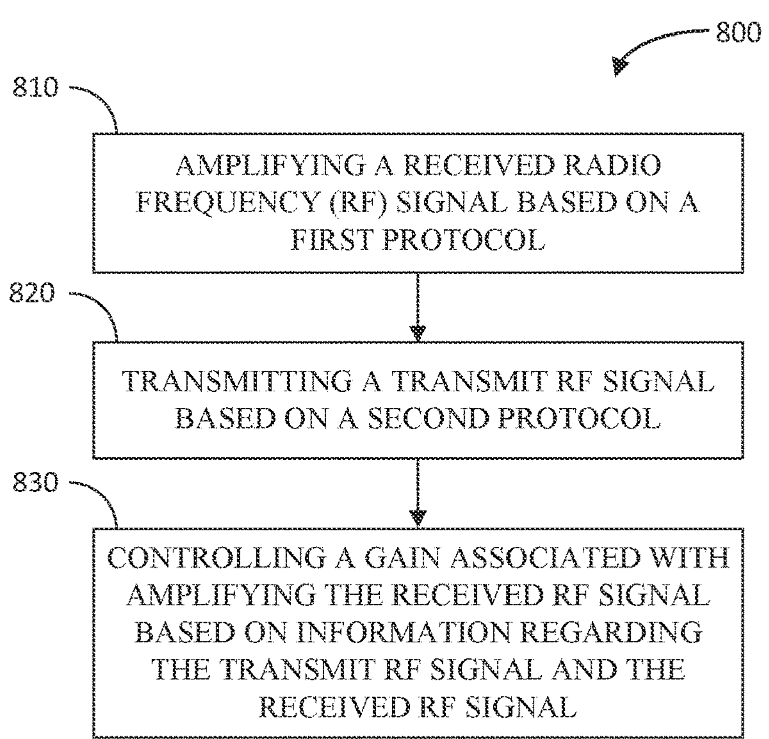
FIG. 8 illustrates a flow diagram of an example method of processing a received radio frequency (RF) signal in accordance with another aspect of the disclosure.

FIG. 8 illustrates a flow diagram of an example method 800 of processing a received radio frequency (RF) signal in accordance with another aspect of the disclosure. The method 800 includes amplifying a received radio frequency (RF) signal based on a first protocol (block 810). Examples of means for amplifying a received radio frequency (RF) signal based on a first protocol include any of the LNAs described herein.

The method 800 further includes transmitting a transmit RF signal based on a second protocol (block 820). Examples of means for transmitting a transmit RF signal based on a second protocol include any of the transmitters described herein. Additionally, the method 800 includes controlling a gain associated with amplifying the received RF signal based on information regarding the transmit RF signal and the received RF signal. Examples of means for controlling a gain associated with amplifying the received RF signal based on information regarding the transmit RF signal and the received RF signal include any of the control circuits (e.g., Tx/Rx COEX managers) described herein.

Figure 9:
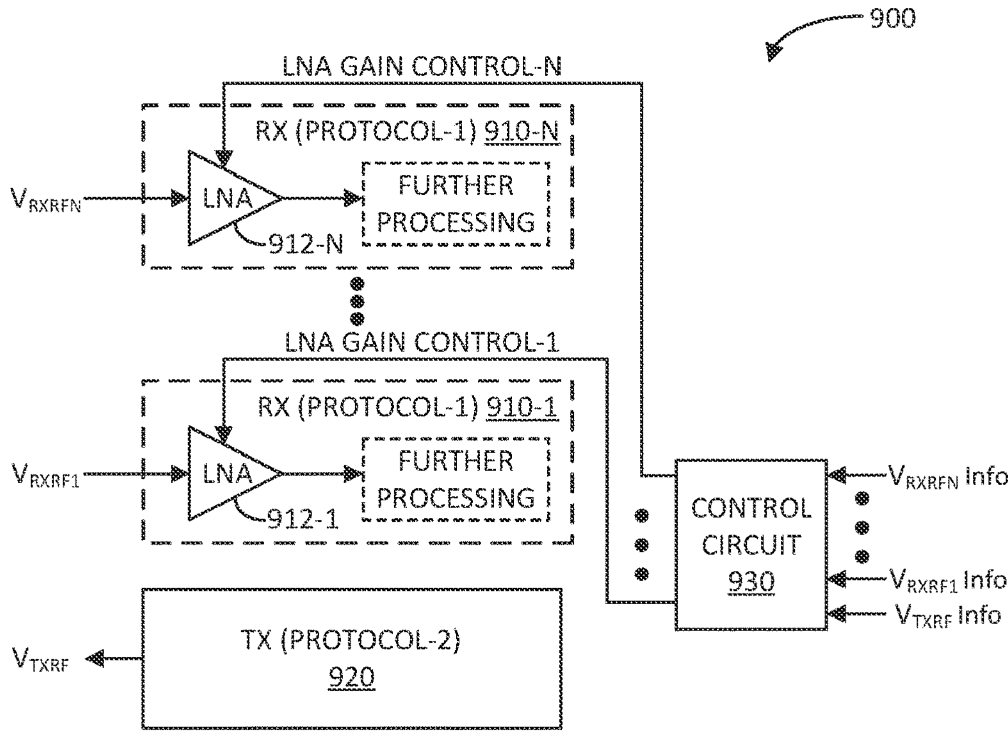
FIG. 9 illustrates a block diagram of another example transceiver in accordance with another aspect of the disclosure.

FIG. 9 illustrates a block diagram of another example transceiver 900 in accordance with another aspect of the disclosure. The transceiver 900 may be an example of one that may have N receivers or receive chains (e.g., N being an integer), where a control circuit may independently control the gains of low noise amplifiers (LNAs) in the N receive chains based on information regarding a transmit radio frequency (RF) signal $V_{TXRF}$ and a set of N receive signals $V_{RXRF1}$ to $V_{RXREN}$, respectively.

The transceiver 900 includes a set of receive chains 910-1 to 910-N including a set of LNAs 912-1 to 912-N configured to amplify a set of received RF signals $V_{RXRF1}$ to $V_{RXREN}$ based on a first protocol (e.g., WWAN) for further processing, respectively; a transmitter 920 configured to generate a transmit radio frequency (RF) signal $V_{TXRX}$ based on a second protocol (e.g., WLAN/BT/BLE); and a control circuit 930 configured to independently control the gains of the set of LNA 912-1 to 912-N based on information regarding the transmit RF signal $V_{TXRX}$ and the set of received RF signals $V_{RXRF1}$ to $V_{RXREN}$, respectively.

The following provides an overview of aspects of the present disclosure:

Aspect 1: An apparatus, comprising: a receiver including a low noise amplifier (LNA) configured to amplify a received radio frequency (RF) signal based on a first protocol; a transmitter configured to generate a transmit RF signal based on a second protocol; and a first control circuit configured to control a gain of the LNA based on information regarding the transmit RF signal and the received RF signal.

Aspect 2: The apparatus of aspect 1, wherein the information includes whether the transmit RF signal will be transmitted concurrently with an expected reception of the received RF signal during a time interval.

Aspect 3: The apparatus of aspect 2, wherein the first control circuit is configured to set the gain of the LNA to a first gain state for amplification of the received RF signal during the time interval based on the information indicating that the transmit RF signal is not scheduled to be transmitted during the time interval.

Aspect 4: The apparatus of aspect 3, wherein the first control circuit is configured to set the gain of the LNA to a second gain state for amplification of the received RF signal during the time interval based on the information indicating that the transmit RF signal will be transmitted during the time interval.

Aspect 5: The apparatus of aspect 4, wherein the gain of the LNA in the first gain state is higher than the gain of the LNA in the second gain state.

Aspect 6: The apparatus of any one of aspects 2-5, wherein the information includes a transmit frequency of the transmit RF signal and a reception frequency of the received RF signal during the time interval.

Aspect 7: The apparatus of aspect 6, wherein the first control circuit is configured to set the gain of the LNA to a first gain state for amplification of the received RF signal during the time interval based on the information that indicates a first level of interference based on the transmit frequency and the reception frequency.

Aspect 8: The apparatus of aspect 7, wherein the first control circuit is configured to set the gain of the LNA to the second gain state for amplification of the received RF signal during the time interval based on the information that indicates a second level of interference based on the transmit frequency and the reception frequency, the second level of interference being higher than the first level of interference.

Aspect 9: The apparatus of aspect 8, wherein the gain of the LNA in the first gain state is higher than the gain of the LNA in the second gain state.

Aspect 10: The apparatus of any one of aspects 2-9, wherein the information includes a power level of the transmit RF signal during the time interval.

Aspect 11: The apparatus of aspect 10, wherein the first control circuit is configured to set the gain of the LNA to a first gain state for amplification of the received RF signal during the time interval based on the information indicating that the power level of the transmit RF signal is below a threshold during the time interval.

Aspect 12: The apparatus of aspect 11, wherein the first control circuit is configured to set the gain of the LNA to a second gain state for amplification of the received RF signal during the time interval based on the information indicating that the power level of the transmit RF signal is above the threshold during the time interval.

Aspect 13: The apparatus of aspect 12, wherein the gain of the LNA in the first gain state is higher than the gain of the LNA in the second gain state.

Aspect 14: The apparatus of aspect 1, wherein the first control circuit is configured to set the gain of the LNA to a first gain state for amplification of the received RF signal during a time interval if the information indicates that any of the following conditions are not met: the transmit RF signal will be transmitted concurrently with the reception of the received RF signal during the time interval; a transmit frequency of the transmit RF signal and a reception frequency of the received RF signal during the time interval is identified as a pairing for setting the gain of the LNA to a second gain state; and a power level of the transmit RF signal is above a threshold during the time interval.

Aspect 15: The apparatus of aspect 14, wherein the first control circuit is configured to set the gain of the LNA to the second gain state for amplification of the received RF signal during the time interval if the information indicates that the aforementioned conditions are met.

Aspect 16: The apparatus of any one of aspects 1-15, wherein the receiver comprises: one or more frequency downconverting stages configured to generate a received baseband signal based on the received RF signal amplified by the LNA; and a second control circuit configured to control the gain of the LNA based on an energy estimation of the received baseband signal.

Aspect 17: The apparatus of aspect 16, wherein the second control circuit is configured to set the gain of the LNA to a first gain state if the energy estimation of the received baseband signal is below a threshold.

Aspect 18: The apparatus of aspect 17, wherein the second control circuit is configured to set the gain of the LNA to a second gain state if the energy estimation of the received baseband signal is above the threshold.

Aspect 19: The apparatus of any one of aspects 1-18, wherein the first protocol includes a wireless wideband area network (WWAN) protocol, wherein the second protocol includes a wireless local area network (WLAN) protocol, and wherein the first control circuit is part of a WWAN protocol subsystem.

Aspect 20: A method, comprising: amplifying a received radio frequency (RF) signal based on a first protocol; transmitting a transmit RF signal based on a second protocol; and controlling a gain associated with amplifying the received RF signal based on information regarding the transmit RF signal and the received RF signal.

Aspect 21: The method of aspect 20, wherein the information includes whether the transmit RF signal will be transmitted concurrently with the reception of the received RF signal during a time interval.

Aspect 22: The method of aspect 21, wherein controlling the gain comprises setting the gain to a first gain state for amplification of the received RF signal during the time interval based on the information indicating that the transmit RF signal will not be transmitted concurrently with the reception of the received RF signal during the time interval.

Aspect 23: The method of aspect 22, wherein controlling the gain comprises setting the gain to a second gain state for amplification of the received RF signal during the time interval based on the information indicating that the transmit RF signal will be transmitted concurrently with the reception of the received RF signal during the time interval, wherein the gain associated with the first gain state is higher than the gain associated with the second gain state.

Aspect 24: The method of any one of aspects 21-23, wherein the information includes a transmit frequency of the transmit RF signal and a reception frequency of the received RF signal during the time interval.

Aspect 25: The method of aspect 24, wherein controlling the gain comprises setting the gain to a first gain state for amplification of the received RF signal during the time interval based on the information not identifying the transmit and reception frequency pairing as a factor for setting the gain to a second gain state.

Aspect 26: The method of aspect 25, wherein controlling the gain comprises setting the gain to the second gain state for amplification of the received RF signal during the time interval based on the information identifying the transmit and reception frequency pairing as a factor for setting the gain of the LNA to the second gain state, wherein the gain associated with the first gain state is higher than the gain associated with the second gain state.

Aspect 27: The method of any one of aspects 21-26, wherein the information includes a power level of the transmit RF signal during the time interval.

Aspect 28: The method of aspect 27, wherein controlling the gain comprises setting the gain to a first gain state for amplification of the received RF signal during the time interval based on the information indicating that the power level of the transmit RF signal is below a threshold during the time interval.

Aspect 29: The method of aspect 28, wherein controlling the gain comprises setting the gain to a second gain state for amplification of the received RF signal during the time interval based on the information indicating that the power level of the transmit RF signal is above the threshold during the time interval, wherein the gain associated with the first gain state is higher than the gain associated with the second gain state.

Aspect 30: An apparatus, comprising: means for amplifying a received radio frequency (RF) signal based on a first protocol; means for transmitting a transmit RF signal based on a second protocol; and means for controlling a gain associated with amplifying the received RF signal based on information regarding the transmit RF signal and the received RF signal.

Aspect 31: An apparatus, comprising: a set of receive chains including a set of low noise amplifiers (LNAs) configured to amplify a set of received radio frequency (RF) signals based on a wireless wideband area network (WWAN) protocol, respectively; a transmitter configured to generate a transmit RF signal based on a wireless local area network (WLAN) protocol; and a control circuit configured to control a set of gains of the set of LNAs based on information regarding power level and timing of the transmit RF signal and information regarding the set of received RF signals, respectively.

Aspect 32: The apparatus of aspect 31, wherein the control circuit is configured to control the set of gains independently.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:

a receiver including a low noise amplifier (LNA) configured to amplify a received radio frequency (RF) signal based on a first protocol;

a transmitter configured to generate a transmit RF signal based on a second protocol; and a first control circuit configured to control a gain of the LNA based on information regarding the transmit RF signal and the received RF signal;

wherein the receiver comprises:

one or more frequency downconverting stages configured to generate a received baseband signal based on the received RF signal amplified by the LNA; and a second control circuit configured to control the gain of the LNA based on an energy estimation of the received baseband signal.

2. The apparatus of claim 1, wherein the information indicates whether the transmit RF signal is transmitted concurrently with an expected reception of the received RF signal during a time interval.

3. The apparatus of claim 2, wherein the first control circuit is configured to set the gain of the LNA to a first gain state for amplification of the received RF signal during the time interval based on the information indicating that the transmit RF signal is not scheduled to be transmitted during the time interval.

4. The apparatus of claim 3, wherein the first control circuit is configured to set the gain of the LNA to a second gain state for amplification of the received RF signal during the time interval based on the information indicating that the transmit RF signal will be transmitted during the time interval.

5. The apparatus of claim 4, wherein the gain of the LNA in the first gain state is higher than the gain of the LNA in the second gain state.

6. The apparatus of claim 2, wherein the information includes a transmit frequency of the transmit RF signal and a reception frequency of the received RF signal during the time interval.

7. The apparatus of claim 6, wherein the first control circuit is configured to set the gain of the LNA to a first gain state for amplification of the received RF signal during the time interval based on the information that indicates a first level of interference based on the transmit frequency and the reception frequency.

8. The apparatus of claim 7, wherein the first control circuit is configured to set the gain of the LNA to a second gain state for amplification of the received RF signal during the time interval based on the information that indicates a second level of interference based on the transmit frequency and the reception frequency, the second level of interference being higher than the first level of interference.

9. The apparatus of claim 8, wherein the gain of the LNA in the first gain state is higher than the gain of the LNA in the second gain state.

10. The apparatus of claim 2, wherein the information includes a power level of the transmit RF signal during the time interval.

11. The apparatus of claim 10, wherein the first control circuit is configured to set the gain of the LNA to a first gain state for amplification of the received RF signal during the time interval based on the information indicating that the power level of the transmit RF signal is below a threshold during the time interval.

12. The apparatus of claim 11, wherein the first control circuit is configured to set the gain of the LNA to a second gain state for amplification of the received RF signal during the time interval based on the information indicating that the power level of the transmit RF signal is above the threshold during the time interval.

13. The apparatus of claim 12, wherein the gain of the LNA in the first gain state is higher than the gain of the LNA in the second gain state.

14. The apparatus of claim 1, wherein the first control circuit is configured to set the gain of the LNA to a first gain state for amplification of the received RF signal during a time interval if the information indicates that any of the following conditions are not met:

- the transmit RF signal will be transmitted concurrently with the reception of the received RF signal during the time interval;
- a transmit frequency of the transmit RF signal and a reception frequency of the received RF signal during the time interval is identified as a pairing for setting the gain of the LNA to a second gain state; or
- a power level of the transmit RF signal is above a threshold during the time interval.

15. The apparatus of claim 14, wherein the first control circuit is configured to set the gain of the LNA to the second gain state for amplification of the received RF signal during the time interval if the information indicates that the aforementioned conditions are met.

16. The apparatus of claim 1, wherein the second control circuit is configured to set the gain of the LNA to a first gain state if the energy estimation of the received baseband signal is below a threshold.

17. The apparatus of claim 16, wherein the second control circuit is configured to set the gain of the LNA to a second gain state if the energy estimation of the received baseband signal is above the threshold.

18. The apparatus of claim 1, wherein the first protocol includes a wireless wideband area network (WWAN) protocol, wherein the second protocol includes a wireless local area network (WLAN) protocol, and wherein the first control circuit is part of a WWAN protocol subsystem.

19. A method, comprising:

- amplifying a received radio frequency (RF) signal based on a first protocol;
- transmitting a transmit RF signal based on a second protocol;
- controlling a gain associated with amplifying the received RF signal based on information regarding the transmit RF signal and the received RF signal;
- generating a received baseband signal based on the amplified received RF signal; and
- controlling the gain based on an energy estimation of the received baseband signal.

20. The method of claim 19, wherein the information indicates whether the transmit RF signal is transmitted concurrently with the reception of the received RF signal during a time interval.

21. The method of claim 20, wherein controlling the gain comprises setting the gain to a first gain state for amplification of the received RF signal during the time interval based on the information indicating that the transmit RF signal will not be transmitted concurrently with the reception of the received RF signal during the time interval.

22. The method of claim 21, wherein controlling the gain comprises setting the gain to a second gain state for amplification of the received RF signal during the time interval based on the information indicating that the transmit RF signal will be transmitted concurrently with the reception of the received RF signal during the time interval, wherein the gain associated with the first gain state is higher than the gain associated with the second gain state.

23. The method of claim 20, wherein the information includes a transmit frequency of the transmit RF signal and a reception frequency of the received RF signal during the time interval.

24. The method of claim 23, wherein controlling the gain comprises setting the gain to a first gain state for amplification of the received RF signal during the time interval based on the information not identifying the transmit and reception frequency pairing as a factor for setting the gain to a second gain state.

25. The method of claim 24, wherein controlling the gain comprises setting the gain to the second gain state for amplification of the received RF signal during the time interval based on the information identifying the transmit and reception frequency pairing as a factor for setting the gain of the LNA to the second gain state, wherein the gain associated with the first gain state is higher than the gain associated with the second gain state.

26. The method of claim 20, wherein the information includes a power level of the transmit RF signal during the time interval.

27. The method of claim 26, wherein controlling the gain comprises setting the gain to a first gain state for amplification of the received RF signal during the time interval based on the information indicating that the power level of the transmit RF signal is below a threshold during the time interval.

28. The method of claim 27, wherein controlling the gain comprises setting the gain to a second gain state for amplification of the received RF signal during the time interval based on the information indicating that the power level of the transmit RF signal is above the threshold during the time interval, wherein the gain associated with the first gain state is higher than the gain associated with the second gain state.

29. An apparatus, comprising:

a set of receive chains including a set of low noise amplifiers (LNAs) configured to amplify a set of received radio frequency (RF) signals based on a wireless wideband area network (WWAN) protocol, respectively;

a transmitter configured to generate a transmit RF signal based on a wireless local area network (WLAN) protocol; and a control circuit configured to control a set of gains of the set of LNAs based on information regarding power level and timing of the transmit RF signal and information regarding the set of received RF signals, respectively;

wherein the set of receive chains comprise:

one or more frequency downconverting stages configured to generate a set of received baseband signals based on the set of received RF signals amplified by the set of LNAs; and a second control circuit configured to control the set of gains of the set of LNAs based on an energy estimation of the set of received baseband signals.

* * * * *